Jan. 25, 1944.   M. P. GRAHAM   2,340,119
QUICK DISCONNECT COUPLING
Filed Jan. 5, 1942
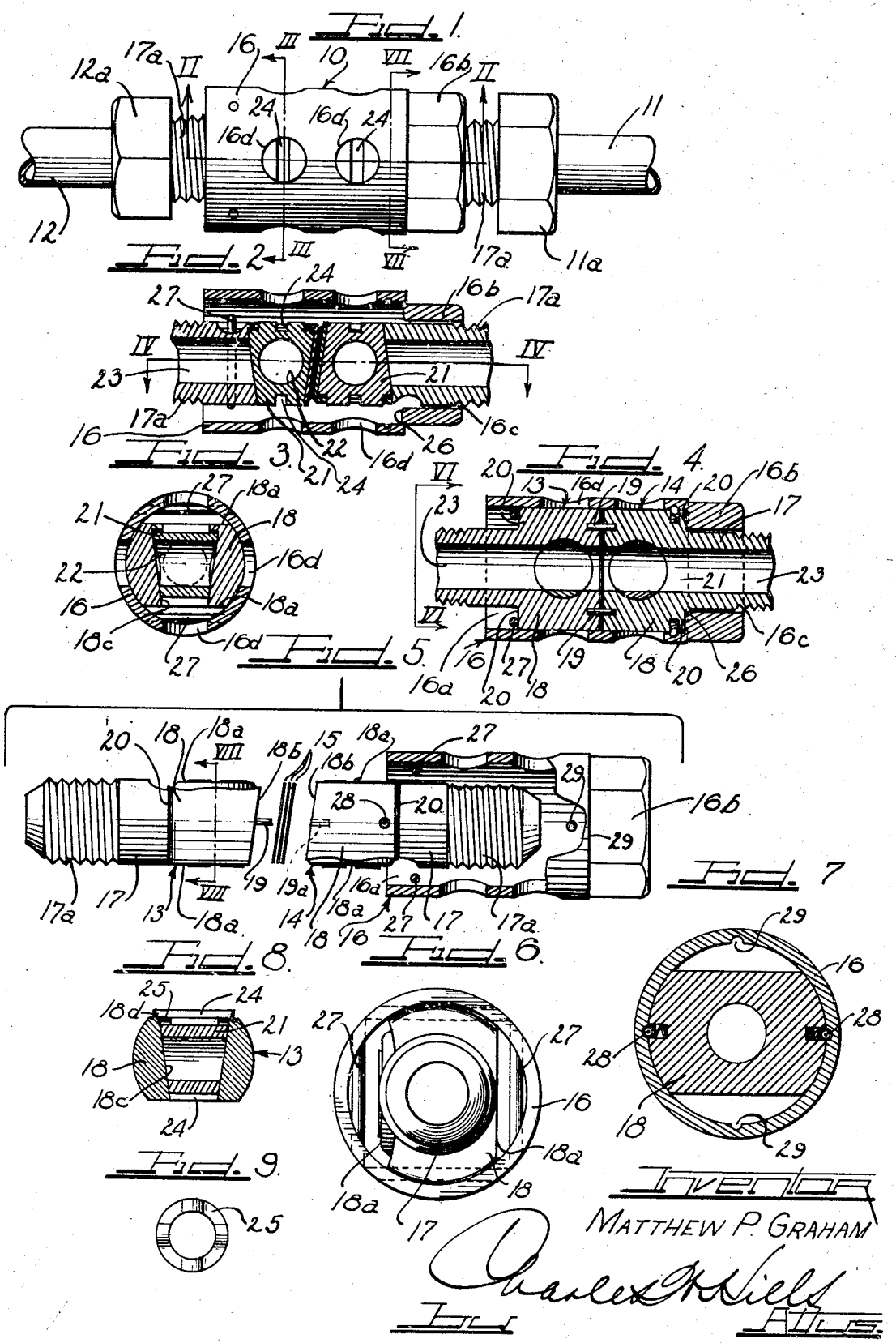

Patented Jan. 25, 1944

2,340,119

UNITED STATES PATENT OFFICE 2,340,119

QUICK DISCONNECT COUPLING

Matthew P. Graham, Detroit, Mich., assignor to Thompson Products Incorporated, Cleveland, Ohio, a corporation of Ohio Application January 5, 1942, Serial No. 425,585

3 Claims. (Cl. 137—69)

This invention relates to a device for connecting the ends of conduits to place them in full fluid flow communication and for sealing the ends of the conduits when the same are disconnected.

More particularly, this invention relates to a coupling including a pair of passaged parts equipped with plug type valves and a telescoping sleeve for holding the parts in end to end relation whereby the valves can be opened and a clear fluid passage free from obstructions provided through the coupling.

The device of this invention is adapted for coupling together the ends of tubes, pipes or conduits in general to place the same in unrestricted communication and to seal the ends thereof when the coupling is broken. The device of the invention is especially useful in any system wherein conduits must be coupled together in fluid flow communication and must be uncoupled and sealed against loss of fluid therein. The device is especially useful in airplanes to form a quick disconnect coupling in the airplane fuel line, oil line or the like, permitting dismounting of the airplane engine without draining any of the supply tanks for the engine.

In accordance with this invention a pair of mating conduit parts are equipped with pet cocks or plug type valves. These conduit parts are adapted to be mounted in end to end relation for defining a clear passage therethrough when the pet cocks or valves are open. Each conduit part is fixedly carried by a pipe, hose or the like passaged member. The conduit parts have a circular cross section but are provided with diametrically opposed flat sides. When the parts are placed in abutting relation, a sleeve-like housing is adapted to be slipped thereover and rotated through one-quarter turn for locking the parts in coupled relation. The housing has an abutting shoulder for one of the parts and a pair of pins for abutting the other of the parts. The pins are spaced apart in the housing for a sufficient distance to permit passage of the flat sides of the parts therebetween but when the housing is rotated one-quarter turn relative to the parts, the pins will prevent removal of the parts from the sleeeve and will hold the parts in thrusting end to end relation.

The sleeve-like housing is apertured so that a screw driver or other tool can be inserted therein to actuate the pet cocks or plug valves of the parts. A gasket may be interposed between the parts to prevent leakage. Alternately one of the parts can have a soft metal face such as lead or one or both of the parts can be covered with a resilient material such as an artificial rubber which is resistant to the action of oils and gasolines.

It is, then, an object of the invention to provide an inexpensive quick disconnect coupling and seal for the ends of conduits.

Another object of the invention is to provide a coupling having a locking sleeve holding a pair of plug valves in end to end relation.

A still further object of the invention is to provide a simple, inexpensive coupling including a pair of independent mating pet cock members and a telescoping sleeve for detachably holding the pet cock members together.

A still further object of this invention is to provide a plug type valve for a coupling wherein the plug is continually urged into full seating engagement with its housing thereby preventing leakage.

A still further object of the invention is to provide a coupling including a plurality of valved parts with a sleeve which locks the parts together upon relative rotation thereto.

A further object of this invention is to provide a coupling which seals conduit ends when the same are disconnected and which joins the conduit ends in fluid flow communication upon quarter-turn rotations of a sleeve and a pair of valves.

Other and further objects of the invention will be apparent to those skilled in the art from the following detailed description of the annexed sheet of drawings which, by way of preferred example, illustrates one embodiment of the invention.

On the drawing:

Figure 1 is a side elevational view of a coupling according to this invention illustrating the same as connectng the ends of a pair of conduits.

Figure 2 is a fragmentary longitudinal cross-sectional view taken along the line II—II of Figure 1.

Figure 3 is a transverse cross-sectional view taken along the line III—III of Figure 1.

Figure 4 is a longitudinal cross-sectional view taken along the line IV—IV of Figure 2 but illustrating the plug valves in opened position.

Figure 5 is an exploded side elevational view, with parts broken away and shown in vertical cross section, of the elements in the coupling of this invention.

Figure 6 is an end elevational view along the line VI—VI of Figure 4.

Figure 7 is a transverse cross-sectional view along the line VII—VII of Figure 1.

Figure 8 is a transverse cross-sectional view along the line VIII—VIII of Figure 5 illustrating the manner in which the plug of the valve is resiliently urged into full seated position in its housing.

Figure 9 is a plan view of a corrugated washer useful in urging the plug valve into a full seated position.

As shown on the drawing:

As shown in Figure 1, the coupling 10 is adapted to couple together the ends of tubes 11 and 12. As shown in Figure 5 the coupling 10 is composed of a pair of plug valve housings 13 and 14 adapted to be placed in end to end relation with gaskets 15 therebetween, and a sleeve-like housing 16 adapted to be telescoped over the plug housings 13 and 14.

The plug valve housing 13 has a hollow cylindrical shank 17 with a threaded outer end portion 17a adapted to project from the housing 16 as shown in Figure 1 and receive in threaded relation thereon a nut 12a for connecting the tube 12 thereto. The housing 13 has an enlarged head 18 of circular cross section as best shown in Figure 3. However, the diametrically opposite sides of the head 18 are flat as at 18a. The head 18 has a flat face or side wall 18b which, if desired, can be in sloping relation to the flat ends 18a. Pins such as 19 project from the face 18b.

Since the head 18 is of larger diameter than the shank 17 except at the flat areas 18a thereof, shoulders such as 20 are provided between the head and shank.

As shown in Figure 3, the head 18 has a tapered transverse bore 18c therethrough rotatably seating a frusto-conical plug 21. The plug 21 has a circular bore 22 extending transversely therethrough. The bore 22 is the same diameter as the bore 23 through the shank 17 and head 18, so that when the plug is rotated to open position, as shown in Figure 4, a smooth, continuous passage extends completely through the valve housing 13. The plug 21 has slotted ends 24 adapted to receive a screw driver or other turning tool for rotating the plug in the housing.

As best shown in Figure 8 the plug 21 is constantly urged into full seated relation in the bore 18c of the housing head 18 by means of a corrugated or fluted resilient washer 25 best shown in Figure 9. This washer is disposed over the large end of the plug and a portion 18d of the head surrounding the washer is spun over the washer to partially collapse the same and thereby cause it to continually thrust against the plug for urging the plug toward the small end of the bore 18c. This provides a convenient way of preventing leakage between the plug and housing.

The valve housing 14 of the coupling is of the same construction as the valve housing 13 and corresponding parts have been identified by the same reference numerals. Thus, as shown in Figure 1, the threaded shank 17a of the housing 14 is adapted to receive a nut 11a for joining the tube 11 to the shank. Instead of providing pins 19 on the face 18b of the housing 14, however, this face has pin recesses 18a therein.

The head 18 of the valve housing 14 contains a plug 21 identical with the plug of the housing 13.

The valve housings 13 and 14 are adapted to be placed in end to end relation with the pins 19 extending through the gaskets 15 and seated in the pin recesses 18a.

The sleeve 16 has an open end 16a adapted to receive the heads 18 of the valve housings 13 and 14. The other end of the sleeve has an integral hexagonal head 16b with a reduced diameter bore 16c therethrough. A shoulder 26 is thus provided at the inner end of the housing as best shown in Figure 4. The bore 16c of the head 16b is sufficiently large to receive the shank 17 freely therethrough.

When the coupling 10 is mounted in position between the tubes such as 11 and 12, therefore, the sleeve 16 can slide over the shank 17 of the valve housing 14 between the nut 11a and the shoulders 20 on the head 18 of the valve housing 14.

Pins 27 extend through the sleeve 16 near the open end 16a thereof. These pins are spaced from the shoulder 26 of the sleeve at a distance which is equal to the distance between the shoulders 20 on the valve housings 13 and 14 when these housings are urged together in full thrusting end to end relation.

As shown in Figures 3 and 6 the pins 27 are spaced apart from each other for a distance sufficient to permit the valve housing head 18 to pass therebetween only when the flat faces 18a thereof are adjacent the pins. The circular side walls of the heads 18 are of substantially the same diameter as the inside diameter of the sleeve as shown in Figure 4 so that when the sleeve is rotated to move the pins 27 for one-quarter turn, these pins will thrust against the shoulders 20 of the valve housing 13 as shown in Figure 4. Thus a quarter-turn rotation of the sleeve 16 joins the valve housings 13 and 14 in end to end relation and the pins 27 will prevent separation of the valve housings until the sleeve is again rotated to position the pins adjacent the flat sides of the housing.

Since the gaskets 15 between the valve housings can be somewhat resilient they are adapted to be compressed between the faces 18b of the housings thereby sealing these faces so that no leakage will occur from the passages 23. The pins 27 can be bowed slightly so that they will have somewhat of a spring action tending to urge the valve housings together.

Alternatively, of course, gaskets 15 could be replaced with a soft facing on either or both faces 18b. The gaskets are preferably carried by one of the valve housings so that they will not be lost when the parts are uncoupled.

The sleeve 16 has sets of openings 16d at 90° intervals therein so as to register with the screwdriver slots 24 of the plugs 21.

These openings 16d are so positioned with respect to the pins 27 that they will always register with the screwdriver slots 24 when the pins are thrusting against the shoulders 20. Thus a screwdriver or other tool can be inserted through the sleeve 16 when the parts are coupled together as shown in Figure 4 to rotate the plugs 21 to open position and thereby join the passages 23. The tubes 11 and 12 will thus be placed in full fluid flow communication and the passages 23 have no obstructions or irregularities therein to interfere with the fluid flow.

If desired, as shown in Figures 5 and 7, one or both of the heads 18 of the valve housing can have spring pressed detents 28 in the circular portion thereof to project into recesses 29 in the interior of the sleeve 16. The recesses 29 are so positioned in the sleeve as to receive the detents 28 when the sleeve is rotated so as to bring the pins 27 into thrusting engagement with the shoulders 20 as described above. Additional recesses 29 can be provided in the sleeve 16 to receive the detents 28 of the valve housing 14 when the sleeve is rotated to uncouple the parts. Thus the quarter-turn rotation of the sleeve to locked and unlocked position will be gauged by the spring pressed detents and these detents will give an indication to the operator whenever the sleeve is rotated to proper position for either the coupling or uncoupling operation.

From the above descriptions it will be understood that the device of this invention includes two valve housings adapted to be placed in end to end relation. Each of these valve housings carries a plug type valve or petcock which can be manually rotated to open or close the housing. A sleeve telescopes the valve housings and is equipped with means for locking the same in end to end relation. The coupling is connected by quarter-turn rotation of the sleeve. The plugs or pet cocks in each of the valve housings are continuously urged into full seating engagement with the housings thereby preventing leakage. The locking means in the sleeve can be somewhat resilient so as to continually thrust against valve housings thereby maintaining the same in tight face thrusting relation.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A quick disconnect coupling comprising a pair of complementary valve housings each having a hollow shank portion and an enlarged head portion with segmental cylindrical side walls, said side walls having flat portions, shoulders between said heads and shanks, each of said heads having mating faces adapted to be thrust against each other, an open ended sleeve adapted to receive the valve housings therein, said sleeve having an internal shoulder adapted to thrust against the shoulders on one of the valve housing heads, and locking instrumentalities in said sleeve in spaced relation from said shoulder adapted to thrust against the shoulders of the other valve housing head when the sleeve is rotated to coupling position and adapted to clear the valve housings along the flat portions thereof to permit separation of the housings in another position of the sleeve.

2. A quick disconnect coupling comprising a pair of passaged petcock carrying members, said members having complementary faces for positioning the members in end to end relation to connect the passages thereof, and a sleeve adapted to be telescoped over the members to hold the same in end to end relation, said sleeve having apertures therethrough giving access to the petcocks whereby the same can be rotated to open position after the petcock carrying members are held in end to end relation by the sleeve.

3. A quick disconnect coupling for joining the ends of conduits which comprises a pair of hollow valve housings having threaded nipples for connection to the conduit ends, each of said valve housings having an enlarged head with segmental cylindrical side walls and flattened side walls, plugs rotatably mounted in the valve heads having the ends thereof exposed at the flattened side walls of the head, said plugs having apertures therethrough for opening and closing the passages in the valves, shoulders between the heads and shanks of the valve housings, and a locking sleeve having abutment means for said shoulders to hold the heads in abutting relation for joining the passages therethrough, one of the abutment means of said sleeve adapted in one position of the sleeve to permit separation of the valve members whereby the parts can be alternately connected and disconnected by rotation of said sleeve.

MATTHEW P. GRAHAM.